United States Patent
Tarao

(10) Patent No.: US 9,149,686 B2
(45) Date of Patent: *Oct. 6, 2015

(54) GOLF BALL

(75) Inventor: Toshiyuki Tarao, Kobe (JP)

(73) Assignee: DUNLOP SPORTS CO, LTD., Kobe-shi (JP)

( * ) Notice: Subject to any disclaimer, the term of this patent is extended or adjusted under 35 U.S.C. 154(b) by 693 days.

This patent is subject to a terminal disclaimer.

(21) Appl. No.: 13/208,434

(22) Filed: Aug. 12, 2011

(65) Prior Publication Data

US 2012/0052983 A1  Mar. 1, 2012

(30) Foreign Application Priority Data

Aug. 26, 2010  (JP) .................................. 2010-189619

(51) Int. Cl.
*A63B 37/00* (2006.01)
*A63B 37/06* (2006.01)
*A63B 37/12* (2006.01)
*C08G 18/10* (2006.01)
*C08G 18/70* (2006.01)
*C08G 18/06* (2006.01)
*C08G 18/74* (2006.01)

(52) U.S. Cl.
CPC ......... *A63B 37/0031* (2013.01); *A63B 37/0024* (2013.01); *A63B 37/0033* (2013.01); *A63B 37/0037* (2013.01); *A63B 37/0043* (2013.01); *A63B 37/0062* (2013.01); *A63B 37/0088* (2013.01); *A63B 37/0094* (2013.01); *C08G 18/10* (2013.01); *C08G 18/70* (2013.01); *C08G 18/06* (2013.01); *C08G 18/74* (2013.01)

(58) Field of Classification Search
CPC ........ C08G 18/10; C08G 18/06; C08G 18/70; C08G 18/74; A63B 37/0094; A63B 37/0024; A63B 37/0027
See application file for complete search history.

(56) References Cited

U.S. PATENT DOCUMENTS

| | | | |
|---|---|---|---|
| 4,256,869 A * | 3/1981 | Schulze et al. | 528/67 |
| 2004/0186210 A1* | 9/2004 | Sullivan | 524/322 |
| 2006/0025238 A1* | 2/2006 | Endo et al. | 473/371 |
| 2006/0128858 A1* | 6/2006 | Sullivan et al. | 524/322 |
| 2008/0234068 A1* | 9/2008 | Comeau et al. | 473/377 |
| 2009/0023515 A1* | 1/2009 | Tarao | 473/371 |
| 2009/0143169 A1 | 6/2009 | Shiga et al. | |

(Continued)

FOREIGN PATENT DOCUMENTS

| | | |
|---|---|---|
| JP | 2006-34740 A | 2/2006 |
| JP | 2009-131508 A | 6/2009 |

(Continued)

*Primary Examiner* — John E Simms, Jr.
(74) *Attorney, Agent, or Firm* — Birch, Stewart, Kolasch & Birch, LLP

(57) ABSTRACT

An object of the present invention is to provide a golf ball with an improved controllability by enhancing a dry spin rate and wet spin rate in a so-called distance type golf ball. The present invention provides a golf ball comprising a constituting member that is formed from a polyurethane composition containing, as a resin component, a polyurethane elastomer using 1,4-bis(isocyanatomethyl)cyclohexane as a polyisocyanate component, wherein the polyurethane composition has a shear loss modulus G" of more than $5.03 \times 10^6$ Pa and $1.17 \times 10^8$ Pa or less when measured in a shear mode using a dynamic viscoelasticity measuring apparatus at the conditions of the temperature of 0° C., and the oscillation frequency of 10 Hz.

16 Claims, 3 Drawing Sheets

(56) References Cited

U.S. PATENT DOCUMENTS

| | | | |
|---|---|---|---|
| 2009/0170634 A1* | 7/2009 | Loper et al. | 473/373 |
| 2009/0170636 A1* | 7/2009 | Kamino et al. | 473/374 |
| 2010/0137076 A1 | 6/2010 | Endo et al. | |
| 2010/0216905 A1* | 8/2010 | Kuwamura et al. | 521/170 |
| 2011/0028642 A1* | 2/2011 | Xie et al. | 524/590 |
| 2011/0033712 A1* | 2/2011 | Xie et al. | 428/425.6 |

FOREIGN PATENT DOCUMENTS

| | | |
|---|---|---|
| JP | 2009-160407 A | 7/2009 |
| WO | WO 2009/051114 A1 | 4/2009 |

\* cited by examiner

GOLF BALL

FIELD OF THE INVENTION

The present invention relates to a golf ball, in particular, a golf ball having a constituting member formed from polyurethane.

DESCRIPTION OF THE RELATED ART

As a resin component constituting a cover of a golf ball, an ionomer resin or polyurethane is used. The ionomer resin is a material suitable for designing a distance type golf ball, because of high rigidity. The polyurethane is softer than the ionomer resin and is a material suitable for designing a spin type golf ball. For example, Japanese Patent Publication No. 2009-160407 A discloses a golf ball having a polyurethane cover.

It is an ultimate goal for those who develop golf balls to provide a golf ball traveling a great distance on driver shots, and stopping quickly on the green on approach shots. In order to make a golf ball stop quickly on the green on the approach shots, for example, soft cover materials are used to increase a spin rate on approach shots (Japanese Patent Publication No. 2006-034740). Further, the inventors of the present invention has filed a Japanese patent application (published as Japanese Patent publication No. 2009-131508) that the spin rate is increased by regulating the steric structure of the polyurethane which is a resin component of the cover. International Patent Publication No. WO2009/051114 discloses a novel polyurethane material.

SUMMARY OF THE INVENTION

If golf balls are classified by the performance characteristic, golf ball are divided into a distance type golf ball and a spin type golf ball. The distance type golf ball employs, for example, a cover having a high hardness and produces a relatively low spin rate. The distance type golf ball focuses on the distance and directional property. On the other hand, the spin type golf ball employs a cover having a low hardness and produces a relatively high spin rate. The spin type golf ball focuses on stopping the golf ball on approach shots by spin or the controllability to draw or fade a golf ball. However, it is required for the distance type golf ball to enhance the controllability by increasing the spin rate.

Since 2010, a new groove regulation has entered in force in a professional golf world on clubs having a loft angle of 25° or more such as irons or wedges. Since this regulation reduces the spin rate on approach shots with irons or wedges, it becomes difficult to stop the golf ball on the green. Especially, on approach shots under a wet condition, since golf balls tend to slip on the club faces, imparting the spin is difficult. Therefore, it is required to increase the spin rate on approach shots under a wet condition.

The present invention has been made in view of the above circumstances. An object of the present invention is to provide a golf ball with an improved controllability by increasing a dry spin rate and wet spin rate in a so-called distance type golf ball.

The present invention that has solved the above problem provides a golf ball comprising a constituting member that is formed from a polyurethane composition containing, as a resin component, a polyurethane elastomer using 1,4-bis(isocyanatomethyl)cyclohexane as a polyisocyanate component, wherein the polyurethane composition has a shear loss modulus G" of more than $5.03 \times 10^6$ Pa and $1.17 \times 10^8$ Pa or less when measured in a shear mode using a dynamic viscoelasticity measuring apparatus at the conditions of the temperature of 0° C., and the oscillation frequency of 10 Hz.

The polyurethane composition used in the present invention shows higher resilience for its hardness, compared with the conventional polyurethane. As a result, if the polyurethane composition of the present invention is used as a material constituting the golf ball, the golf ball traveling a great distance is obtained.

With respect to the deformation of the cover when hitting the golf ball, it is considered that the shear deformation is dominant on approach shots. Based on this hypothesis, the inventors of the present invention have studied characteristics of the polyurethane material, and found that the spin rate on approach shots correlates with the shear loss modulus G" measured in a shear mode at the conditions of a temperature of 0° C. and oscillation frequency of 10 Hz using a dynamic viscoelasticity measuring apparatus. In the present invention, use of the polyurethane composition having a shear loss modulus G" of more than $5.03 \times 10^6$ Pa and $1.17 \times 10^8$ Pa or less provides a golf ball with a high spin rate on approach shots.

In the present invention, the polyurethane composition having a shear loss modulus G" of $8.83 \times 10^7$ Pa or less is preferably used. In the present invention, the reason why the viscoelasticity is measured at the conditions of the temperature of 0° C. and oscillation frequency of 10 Hz is as follows. The contact time between the golf ball and the golf club when hitting the golf ball is several hundreds micro seconds. If this impact is considered as one deformation, this deformation corresponds to the deformation at the frequency of several thousands Hertz. Based on the time-temperature superposition principle of the general polyurethane elastomer, the viscoelasticity measured at the conditions of temperature: room temperature and oscillation frequency: several thousands Hertz correspond to the viscoelasticity measured at the conditions of temperature: 0° C. and oscillation frequency: 10 Hz.

According to the present invention, it is possible to provide a golf ball with an improved controllability by increasing a dry spin rate and wet spin rate in a so-called distance type golf ball.

DESCRIPTION OF THE PREFERRED EMBODIMENT

Figure 1:
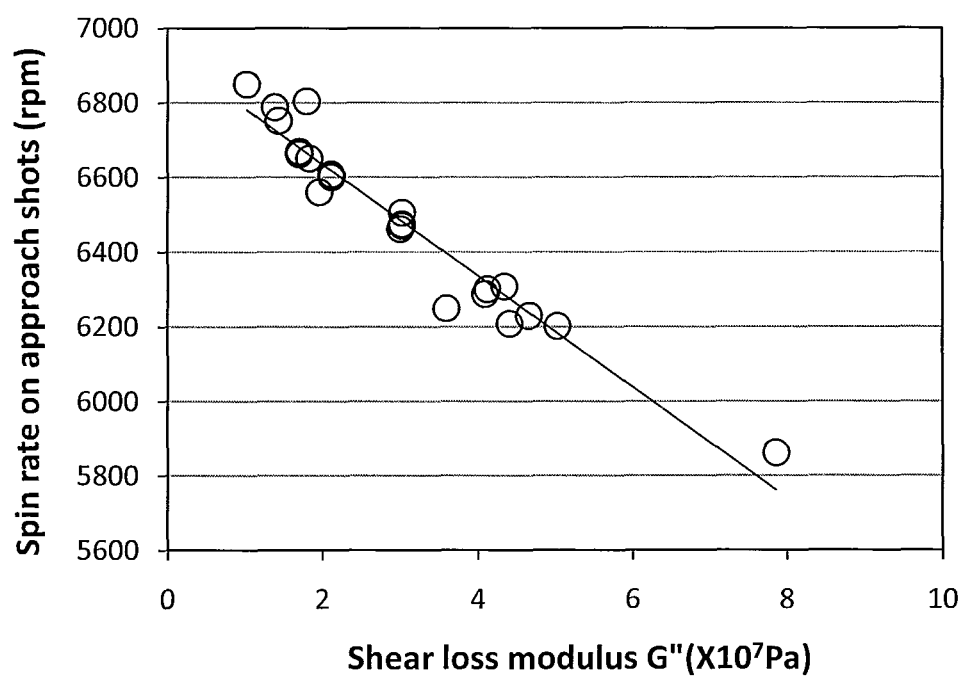
FIG. 1 is a graph showing a correlation between the spin rate on approach shots and the shear loss modulus G"

The present invention provides a golf ball comprising a constituting member that is formed from a polyurethane composition containing, as a resin component, a polyurethane elastomer using 1,4-bis(isocyanatomethyl)cyclohexane as a polyisocyanate component, wherein the polyurethane composition has a shear loss modulus G" of more than $5.03 \times 10^6$ Pa and $1.17 \times 10^8$ Pa or less when measured in a shear mode using a dynamic viscoelasticity measuring apparatus at the conditions of the temperature of 0° C., and the oscillation frequency of 10 Hz.

The polyurethane composition for use in the present invention contains, as a resin component, a polyurethane elastomer using 1,4-bis(isocyanatomethyl)cyclohexane as a polyisocyanate component. The polyurethane elastomer is a reaction product of a polyisocyanate component and a polyol component and is an elastomer having plurality of urethane bonds. If necessary, a polyamine component may be allowed to react.

The polyurethane elastomer used in the present invention is not limited, as long as it uses 1,4-bis(isocyanatomethyl)cyclohexane as a polyisocyanate component. It is preferable that the polyisocyanate component essentially consists of 1,4-bis(isocyanatomethyl)cyclohexane, but other polyisocyanates may be used in combination, to the extent that the effect of the present invention does not deteriorate. In the case of using other polyisocyanates in combination, the content of 1,4-bis(isocyanatomethyl)cyclohexane in the polyisocyanate component is preferably 50 mole % or more, more preferably 70 mole % or more, even more preferably 80 mole % or more, in a molar ratio of isocyanate groups of 1,4-bis(isocyanatomethyl)cyclohexane to all isocyanate groups of the polyisocyanate components.

1,4-bis(isocyanatomethyl)cyclohexane includes configurational isomers of a trans-isomer and a cis-isomer. In the present invention, 1,4-bis(isocyanatomethyl)cyclohexane containing the trans-isomer in a ratio of 80 mole % or more is preferably used. If 1,4-bis(isocyanatomethyl)cyclohexane containing the trans-isomer in a ratio of 80 mole % or more is used, it is possible to strike a balance between resilience and spin rate at a higher level. From this aspect, the ratio of the trans-isomer is preferably 82 mole % or more, more preferably 85 mole % or more. The ratio of the trans-isomer in 1,4-bis(isocyanatomethyl)cyclohexane can be measured, for example, by $^{13}$C-NMR (JOEL α-400 NMR 100 MHz available from JOEL Ltd.). Solvents for preparing samples include deuterated solvents such as chloroform, methanol, dimethyl sulfoxide, preferably include deuterated chloroform. The measuring temperature ranges from 20° C. to 80° C., and is preferably 23° C.

The polyisocyanate component that can be used with 1,4-bis(isocyanatomethyl)cyclohexane is not limited, as long as it has at least two isocyanate groups. Examples of the polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), 1,3-di(isocyanatomethyl)cyclohexane, hexamethylene diisocyanate (HDI), isophorone diisocyanate (IPDI), and norbornene diisocyanate (NBDI). These may be used either alone or as a mixture of at least two of them.

As a polyol component constituting the polyurethane elastomer for use in the present invention, preferably used is a polyol having a number average molecular weight ranging from 200 to 6,000. The polyol having a number average molecular weight ranging from 200 to 6,000 forms a soft segment and imparts the softness to the polyurethane. The number average molecular weight of the polyol is preferably 250 or more, more preferably 300 or more, and even more preferably 1,500 or more. If the number average molecular weight of the polyol is too small, the obtained polyurethane may become hard. If the number average molecular weight is 6,000 or less, it is possible to provide a golf ball with a less spin rate on the driver shots. From this aspect, the number average molecular weight of the polyol is more preferably 4,000 or less, even more preferably 3,000 or less.

The number average molecular weight of the polyol component can be measured by Gel permeation Chromatography using two columns of TSK-GEL SUPREH 2500 (TOSOH Corporation) as a column, polystyrene as a standard material, and tetrahydrofuran as an eluate.

The polyol component having a number average molecular weight from 200 to 6,000 is preferably a polymer polyol. The polymer polyol is a polymer obtained by polymerizing a low molecular compound, and has plurality of hydroxyl groups. Among them, a polymer diol having two hydroxyl groups is more preferable. Use of the polymer diol provides a linear thermoplastic polyurethane and facilitates the molding of the obtained polyurethane into the constituting member of the golf ball.

Examples of the polymer polyol having a number average molecular weight from 200 to 6,000 include a polyether polyol such as polyoxyethylene glycol (PEG), polyoxypropylene glycol (PPG), and polytetramethylene ether glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them. Among them, as the polymer polyol component, polytetramethylene ether glycol is preferably used. Use of the polytetramethylene ether glycol makes it possible to control the spin rates on driver shots and approach shots at the higher level.

The polymer polyol constituting the polyurethane elastomer used in the present invention preferably has a hydroxyl value of 561 mgKOH/g or less, more preferably 173 mgKOH/g or less and preferably has a hydroxyl value of 94 mgKOH/g or more, more preferably 112 mgKOH/g or more, even more preferably 132 mgKOH/g or more. The hydroxyl value of the polyol component can be measured, for example, by an acetylation method according to JIS K1557-1.

The polyurethane elastomer used in the present invention may further have a chain extender as a constituent, unless the effect of the preset invention does not deteriorate. The chain extender includes a low-molecular weight polyol or a low-molecular weight polyamine. Examples of the low-molecular weight polyol may include a diol such as ethylene glycol, diethylene glycol, triethylene glycol, propanediol (e.g., 1,2-propanediol, 1,3-propanediol, and 2-methyl-1,3-propanediol), dipropylene glycol, butanediol (e.g., 1,2-butanediol, 1,3-butanediol, 1,4-butanediol, 2,3-butanediol, and 2,3-dimethyl-2,3-butanediol), neopentyl glycol, pentanediol, hexanediol, heptanediol, octanediol, and 1,4-cyclohexane dimethylol; a trial such as glycerin, trimethylol propane, and hexanetriol; a tetraol or a hexanol such as pentaerythritol and sorbitol.

The low-molecular weight polyamine that can be used as a chain extender may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The chain extender preferably has a molecular weight of 400 or less, more preferably 350 or less, even more preferably less than 200 and preferably has a molecular weight of 30 or more, more preferably 40 or more, even more preferably 45 or more. If the molecular weight is too large, it is difficult to distinguish the chain extender from the high-molecular weight polyol (polymer polyol) constituting a soft segment of the polyurethane. "Low molecular weight polyol" and "Low molecular weight polyamine" are low molecular compounds which do not have a molecular weight distribution, and are distinguished from the polymer polyol having a number average molecular weight from 200 to 6,000 obtained by polymerization of the low molecular weight compound.

The polyurethane elastomer used in the present invention has no limitation on the constitutional embodiments thereof. Examples of the constitutional embodiments are the embodiment where the polyurethane elastomer consists of the polyisocyanate component, the polyol component having a number average molecular weight from 200 to 6,000, and the embodiment where the polyurethane consists of the polyisocyanate component, the polyol component having a number average molecular weight from 200 to 6,000, and the chain extender component.

The polyurethane elastomer used in the present invention may be either a thermoplastic polyurethane elastomer or a thermosetting polyurethane elastomer (two-component curing type polyurethane elastomer). The thermoplastic polyurethane elastomer is a polyurethane elastomer exhibiting plasticity by heating and generally means a polyurethane elastomer having a linear chain structure of a high molecular weight to a certain extent. On the other hand, the thermosetting polyurethane elastomer (two-component curing type polyurethane elastomer) is a polyurethane elastomer obtained by polymerization through a reaction between a relatively low-molecular weight urethane prepolymer and a chain extender (curing agent). The thermosetting polyurethane elastomer includes a polyurethane elastomer having a linear chain structure or polyurethane elastomer having a three-dimensional crosslinked structure depending on a number of a functional group of the prepolymer or the chain extender (curing agent) to be used. In the present invention, the thermoplastic polyurethane elastomer is preferable.

Examples of a method for synthesizing the polyurethane elastomer include a one-shot method and a prepolymer method. The one-shot method is a method of reacting a polyisocyanate component, a polyol component or the like at once. The prepolymer method is a method of reacting a polyisocyanate component and a polyol component or the like in multiple steps. For example, a relatively low-molecular weight urethane prepolymer is synthesized, followed by further polymerization to have a higher-molecular weight. The polyurethane used in the present invention is preferably produced by the prepolymer method.

As an example of producing the polyurethane elastomer by the prepolymer method, the following case will be described in detail, wherein an isocyanate group terminated urethane prepolymer is synthesized and then polymerized with the chain extender.

First, a polyisocyanate component is allowed to react with a polymer polyol component to synthesize an isocyanate group terminated urethane prepolymer. In this case, the charging ratio of the polyisocyanate component to the polymer polyol component is, preferably 1 or larger, more preferably 1.2 or larger, and even more preferably 1.5 or larger, and is preferably 10 or smaller, more preferably 9 or smaller, and even more preferably 8 or smaller in a molar ratio (NCO/OH) of the isocyanate group (NCO) contained in the polyisocyanate component to the hydroxyl group (OH) contained in the polymer polyol component.

The temperature at which the prepolymer reaction is performed is preferably 10° C. or higher, more preferably 30° C. or higher, and even more preferably 50° C. or higher, and is preferably 200° C. or lower, more preferably 150° C. or lower, and even more preferably 100° C. or lower. The reaction time for the prepolymer reaction is preferably 10 minutes or longer, more preferably 1 hour or longer, and even more preferably 3 hours or longer, and is preferably 32 hours or shorter, more preferably 16 hours or shorter, and even more preferably 8 hours or shorter.

Next, the obtained isocyanate group terminated urethane prepolymer is subjected to a chain extension reaction with the chain extender component to obtain the polyurethane elastomer having a high molecular weight. In this case, the charging ratio of the isocyanate group terminated urethane prepolymer to the chain extender component is preferably 0.9 or larger, more preferably 0.92 or larger, and even more preferably 0.95 or larger, and is preferably 1.1 or smaller, more preferably 1.08 or smaller, and even more preferably 1.05 or smaller in a molar ratio (NCO/OH) of the isocyanate group (NCO) contained in the isocyanate group terminated urethane prepolymer to the hydroxyl group (OH) contained in the chain extender component.

The temperature at which the chain extension reaction is performed is preferably 10° C. or higher, more preferably 30° C. or higher, and even more preferably 50° C. or higher, and is preferably 220° C. or lower, more preferably 170° C. or lower, and even more preferably 120° C. or lower. The reaction time for the chain extension reaction is preferably 10 minutes or longer, more preferably 30 minutes or longer, and even more preferably 1 hour or longer, and is preferably 20 days or shorter, more preferably 10 days or shorter, and even more preferably 5 days or shorter.

Both of the prepolymer reaction and the chain extension reaction are preferably conducted in an atmosphere of dry nitrogen.

In synthesizing the polyurethane elastomer, a publicly known catalyst may be used. Examples of the catalyst include a monoamine such as triethylamine, and N,N-dimethylcyclohexylamine; a polyamine such as N,N,N',N'-tetramethylethylenediamine, and N,N,N',N'',N''-pentamethyldiethylenetriamine; a cyclic diamine such as 1,8-diazabicyclo-[5.4.0]-7-undecene (DBU), triethylenediamine; a tin-based catalyst such as dibutyl tin dilaurylate, and dibutyl tin diacetate. These catalysts may be used solely, or two or more of these catalysts may be used in combination. Among these catalysts, a tin-based catalyst such as dibutyl tin dilaurylate, and dibutyl tin diacetate are preferable, and in particular, dibutyl tin dilaurylate is preferably used.

The polyurethane composition used in the present invention preferably contains, as a resin component, only the polyurethane elastomer using 1,4-bis(isocyanatomethyl)cyclohexane as the polyisocyanate component, but may further contain ionomer resins or thermoplastic elastomers, as long as they do not impair the effect of the present invention. In this case, the content of the polyurethane elastomer is preferably 50 mass % or more, more preferably 60 mass % or more, even more preferably 70 mass or more in the resin component.

Examples of the ionomer resin include one prepared by neutralizing at least a part of carboxyl groups in a copolymer, composed of ethylene and α,β-unsaturated carboxylic acid having 3 to 8 carbon atoms with a metal ion; one prepared by neutralizing at least a part of carboxyl groups in a terpolymer composed of ethylene, α,β-unsaturated carboxylic acid having 3 to 8 carbon atoms, and α,β-unsaturated carboxylic acid ester with a metal ion; or a mixture of these two. Examples of the α,β-unsaturated carboxylic acid include acrylic acid, methacrylic acid, fumaric acid, maleic acid, crotonic acid, or the like. In particular, acrylic acid and methacrylic acid are preferable. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Examples of the neutralizing metal ion are: monovalent metal ions such as sodium, potassium, and lithium; divalent metal ions such as magnesium, calcium, zinc, barium, and cadmium; trivalent metal ions such as aluminum, or other metal ions such as tin and zirconium. In particular, sodium ion, zinc ion, and magnesium ion are preferably used in view of the resilience and durability of the golf ball.

Specific examples of the ionomer resin include "Himilan (registered trade mark)" available from MITSUI-DUPONT POLYCHEMICAL CO., LTD, "Surlyn (registered trade mark)" available from DUPONT CO, and "Iotek (registered trade mark)" available from Exxon Co.

Specific examples of the thermoplastic elastomers are a thermoplastic polyamide elastomer having a commercial name of "Pebax (registered trademark) (e.g. "Pebax 2533")" commercially available from Arkema K. K.; a thermoplastic polyurethane elastomer having a commercial name of "Elastollan (registered trademark) (e.g. "Elastollan XNY85A")" commercially available from BASF Japan Co.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polystyrene elastomer having a commercial name of "Rabalon (registered trademark) (e.g. "Rabalon T3221C")" commercially available from Mitsubishi Chemical Corporation. The ionomer resins and the thermoplastic elastomers can be used solely or as a mixture of at least two of them. In the case of using the thermoplastic elastomer in combination, the thermoplastic polyurethane elastomer without using 1,4-bis(isocyanatomethyl)cyclohexane as the polyisocyanate component is preferably used in combination.

The polyurethane composition used in the present invention may contain a pigment component such as a white pigment (for example, titanium oxide) and a blue pigment, a gravity adjusting agent such as calcium carbonate and barium sulfate, a dispersant, an antioxidant, an ultraviolet absorber, a light stabilizer, a fluorescent material or a fluorescent brightener.

The content of the white pigment (for example, titanium oxide) is preferably 0.5 part by mass or more, more preferably 1 part by mass or more, and is preferably 10 parts by mass or less, more preferably 8 parts by mass or less based on 100 parts by mass of the resin component. The white pigment in an amount of 0.5 part by mass or more can impart opacity to the polyurethane composition, while the white pigment in an amount of more than 10 parts by mass may lower the durability of the obtained constituting member of the golf ball.

The polyurethane composition used in the present invention preferably has a slab hardness of 50 or more, more preferably 52 or more, even more preferably 54 or more, and preferably has a slab hardness of 65 or less, more preferably 64 or less, even more preferably 63 or less, in Shore D hardness. If the hardness of the polyurethane composition is too low, the spin rate on driver shots may increase, while if the hardness of the polyurethane composition is too high, the spin rate on approach shots may decrease.

The polyurethane composition for use in the present invention has a shear loss modulus G" of more than $5.03 \times 10^6$ Pa and $1.17 \times 10^8$ Pa or less when measured in a shear mode using a dynamic viscoelasticity measuring apparatus at the conditions of the temperature of 0° C., and the oscillation frequency of 10 Hz. FIG. 1 shows a correlation between the spin rate on approach shots and the shear loss modulus G" in a golf ball using $H_{12}$MDI-PTMG polyurethane elastomer disclosed in Japanese Patent application No. 2009-285367 previously filed. FIG. 1 shows a good correlation between the spin rate on approach shots and the shear loss modulus G". The spin rate on approach shots increases as the shear loss modulus G" is getting small. In the present invention, the polyurethane composition having a shear loss modulus G" of more than $5.03 \times 10^6$ Pa and $1.17 \times 10^8$ Pa or less is used. If the shear loss modulus G" is $1.17 \times 10^8$ Pa or less, the spin rate on approach shots is enhanced. The shear loss modulus G" is preferably $8.83 \times 10^7$ Pa or less, more preferably $6.67 \times 10^7$ Pa or less. Also, if the shear loss modulus G" is more than $5.03 \times 10^6$ Pa, the spin rate on driver shots does not become excessively high. From this aspect, the shear loss modulus G" is preferably $7.5 \times 10^6$ Pa or more, more preferably $1.0 \times 10^7$ Pa or more.

The polyurethane composition for use in the present invention preferably has rebound resilience of 39% or more, more preferably 40% or more, even more preferably 41% or more. If the rebound resilience is 39% or more, since the obtained golf ball has improved resilience, the golf ball travels a great distance. On the other hand, the rebound resilience is as good as higher. The upper limit of the rebound resilience is not specifically limited, and is preferably 50%, more preferably 75%, even more preferably 100%.

The golf ball of the present invention is not limited, as long as it comprises a constituent member formed from the above mentioned polyurethane composition. For example, in a two-piece golf ball comprising a single-layered core and a cover disposed around the core, in a three-piece golf ball comprising a core having a center and a single-layered intermediate layer disposed around the center, and a cover disposed around the core, and in a multi-piece golf ball comprising a core having a center and at least two intermediate layer disposed around the center, and a cover disposed around the core, any one of constituent members may be formed from the polyurethane composition. Among them, it is preferable that the cover is formed from the above polyurethane composition. If the polyurethane composition used in the present invention is used for the cover, the golf ball with a high resilience while keeping a high spin rate on approach shots is obtained.

In the followings, the present invention will be explained based on the preferable golf ball that comprises a core and a cover, wherein the cover is formed from the above polyurethane composition. However, the present invention is not limited to this embodiment.

The cover of the golf ball of the present invention is formed from the above mentioned polyurethane composition (hereinafter, sometimes merely referred to as "cover composition"). A method for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

Molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of directly injection molding the cover composition onto the core, the cover composition in the pellet form obtained by extrusion may be used for injection molding, or the cover materials such as the base resin component, the pigment and the like may be dry blended, followed by directly injection molding. It is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 250° C. is charged into a mold held under the pressure of 9 MPa to 15 MPa for 0.5 second to 5 seconds. After cooling for 10 to 60 seconds, the mold is opened and the golf ball with the cover molded is taken out from the mold.

When molding a cover, the concave portions called "dimple" are usually formed on the surface. After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in lowering flying performance of the golf ball.

In the present invention, the thickness of the cover of the golf ball is preferably 2.0 mm or less, more preferably 1.5 mm or less, even more preferably 1.0 mm or less. If the thickness of the cover is 2.0 mm or less, since it is possible to increase the diameter of the core, the resilience of the obtained golf ball is improved. The lower limit of the thickness of the cover is not limited, but is preferably 0.3 mm, more preferably 0.4 mm, and even more preferably 0.5 mm. If the thickness of the cover is less than 0.3 mm, it may become difficult to mold the cover.

The cover of the golf ball of the present invention preferably has a slab hardness of 50 or more, more preferably 52 or more, even more preferably 54 or more, and preferably has a slab hardness of 65 or less, more preferably 64 or less, even more preferably 63 or less, in Shore D hardness. If the slab hardness of the cover is too low, the spin rate on driver shots may increase, while if the slab hardness of the cover is too high, the spin rate on approach shots may decrease. Herein, the slab hardness of the cover is a measured hardness of the cover composition that is molded into a sheet form by a measuring method described later.

Next, a preferred embodiment of the core of the golf ball of the present invention will be explained. The core of the golf ball of the present invention includes, for example, a single-layered core, and a core consisting of a center and at least one intermediate layer covering the center. The core consisting of a center and at least one intermediate layer covering the center includes, for example, a core consisting of a center and a single-layered intermediate layer covering the center; and a core consisting of a center and multi-piece or multi-layer of intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs, preferably the surface of the spherical center is evenly divided by the ribs. In one embodiment, the ribs are preferably formed as a part of the center in an integrated manner on the surface of the center, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

The core or the center of the golf ball of the present invention, is preferably molded by, for example, heat-pressing a rubber composition (hereinafter, sometimes simply referred to as "core rubber composition") containing a base rubber, a crosslinking initiator, a co-crosslinking agent, and where necessary a filler.

As the base rubber, a natural rubber or a synthetic rubber can be used. Such examples include a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of the co-crosslinking agent needs to be increased in order to obtain an appropriate hardness, which may cause the insufficient resilience.

The co-crosslinking agent is not particularly limited, as long as it has the effect of crosslinking a rubber molecule by graft polymerization to a base rubber molecular chain; for example, α,β-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience.

The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the organic peroxide must be increased to obtain an appropriate hardness which tends to lower the resilience. On the other hand, if the amount of the co-crosslinking agent to be used is more than 50 parts by mass, the core becomes too hard, so that the shot feeling may be lowered.

The filler contained in the core rubber composition is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the resilience tends to be lowered.

As the core rubber composition, an organic sulfur compound, an antioxidant or a peptizing agent may be blended appropriately in addition to the base rubber, the crosslinking initiator, the co-crosslinking agent and the filler.

As the Organic sulfur compound, a diphenyl disulfide or a derivative thereof may be preferably used. Examples of the diphenyl disulfide or the derivative thereof include diphenyl disulfide; a mono-substituted diphenyl disulfide such as bis(4-chlorophenyl)disulfide, bis(3-chlorophenyl)disulfide, bis(4-bromophenyl)disulfide, bis(3-bromophenyl)disulfide, bis(4-fluorophenyl)disulfide, bis(4-iodophenyl)disulfide and bis(4-cyanophenyl)disulfide; a di-substituted diphenyl disulfide such as bis(2,5-dichlorophenyl)disulfide, bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl)disulfide, and bis(2-cyano-5-bromophenyl)disulfide; a tri-substituted diphenyl disulfide such as bis(2,4,6-trichlorophenyl)disulfide, and bis(2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl)disulfide are preferably used, since a golf ball having particularly high resilience can be obtained. The amount of the organic sulfur compound to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The conditions for press-molding the core rubber composition may be determined appropriately depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130° C. to 150° C., and continuously for 5 to 15 minutes at the temperature of 160° C. to 180° C.

The core used in the golf ball of the present invention preferably has a diameter of 38 mm or larger, more preferably 39.0 mm or larger, and even more preferably 40.8 mm or larger, and preferably has a diameter of 42.2 mm or smaller, more preferably 42 mm or smaller, and even more preferably 41.8 mm or smaller. If the diameter of the core is smaller than the above lower limit, the cover becomes so thick that the resulting golf ball would have reduced resilience. On the other hand, if the diameter of the core is larger than the above upper limit, the cover becomes so thin that it is difficult to mold a cover.

In the case that the core has a diameter ranging from 38 mm to 42.2 mm, the compression deformation amount (shrinking amount of the core in a compressive direction) of the core when applying a load from 98 N as an initial load to 1275 N as a final load is preferably 2.40 mm or more, more preferably 2.50 mm or more, even more preferably 2.60 mm or more, and is preferably 3.20 mm or less, and more preferably 3.10 mm or less. If the compression deformation amount is less than 2.40 mm, the shot feeling becomes hard and poor, while if the compression deformation amount is larger than 3.20 mm, the resilience may be lowered.

In a preferable embodiment, the core has a hardness difference between the center and the surface. If the core has an outer-hard and inner-soft structure, the golf ball with a high launch angle and low spin rate on driver shots is obtained. The golf ball with a high launch angle and low spin rate travels a great distance on driver shots. The difference between the surface hardness and the center hardness is preferably 10 or more, more preferably 12 or more, and is preferably 40 or less, more preferably 35 or less, and even more preferably 30 or less in JIS-C hardness. If the hardness difference is more than 40, the durability may be lowered, while if the hardness difference is less than 10, the shot feeling may be hard because of a large impact. The surface hardness of the core is preferably 65 or more, more preferably 70 or more, even more preferably 72 or more, and is preferably 100 or less in JIS-C hardness. If the surface hardness of the core is less than 65 in JIS-C hardness, the core is so soft and the resilience may be lowered, resulting in the short flight distance. On the other hand, if the surface hardness of the core is more than 100, the core is so hard and the shot feeling may deteriorate. The center hardness of the core is preferably 45 or more, more preferably 50 or more, and is preferably 70 or less, and more preferably 65 or less in JIS-C hardness. If the center hardness of the core is less than 45, the core is so soft and the durability may be lowered, while if the center hardness of the core is more than 70, the core is so hard and the shot feeling may be worsened. The hardness difference of the core can be provided by forming an intermediate layer having a higher hardness than that of the center or by properly selecting the heat molding conditions of the core or center. The center hardness of the core means a JIS-C hardness obtained by cutting a spherical core into halves and measuring at the central point of the cut surface using a JIS-C type spring hardness tester. The surface hardness means a hardness measured at a surface part of the core using a JIS-C type spring hardness tester. In the case that the core has a multi-layered structure, the surface hardness of the core means the hardness measured at the surface of the outermost layer of the core.

In the case that the core consists of a center and at least one intermediate layer covering the center, the center can be formed from the core rubber composition described above. The diameter of the center is preferably 30 mm or more, more preferably 32 mm or more, and is preferably 41 mm or less, more preferably 40.5 mm or less. If the diameter of the center is less than 30 mm, the intermediate layer or the cover layer must be made thicker than the desired thickness, resulting in the lowered resilience. On the other hand, if the diameter of the center is more than 41 mm, the intermediate layer or the cover must be made thinner than the desired thickness, and hence the intermediate layer or the cover does not function well.

Examples of the material for the intermediate layer are a cured product of a rubber composition, a conventional ionomer resin, a thermoplastic polyamide elastomer having a commercial name of "Pebax (registered trademark) (e.g. Pebax 2533)" available from Arkema; a thermoplastic polyester elastomer having a commercial name of "Hytrel (registered trademark) (e.g. Hytrel 3548, Hytrel 4047)" available from Du Pont-Toray Co., Ltd.; a thermoplastic polyurethane elastomer having a commercial name of "Elastollan (registered trademark) (e.g. Elastollan XNY97A)" available from BASF Japan Co., a thermoplastic polystyrene elastomer having a commercial name of "Rabalon (registered trademark) (e.g. Rabalon SR04, Rabalon T3339C, Rabalon T3221C)" available from Mitsubishi Chemical Corporation. The above materials for the intermediate layer can be used solely or as a mixture of at least two of them.

Examples of the ionomer resin include one prepared by neutralizing at least a part of carboxyl groups in a copolymer, composed of ethylene and α,β-unsaturated carboxylic acid having 3 to 8 carbon atoms with a metal ion; one prepared by neutralizing at least a part of carboxyl groups in a terpolymer composed of ethylene, α,β-unsaturated carboxylic acid having 3 to 8 carbons atoms, and α,β-unsaturated carboxylic acid ester with a metal ion; or a mixture of these two.

Specific examples of the ionomer resins include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM7311 (Mg), Himilan AM7329(Zn); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 6320 (Mg), Surlyn 8120 (Na), Surlyn 8320 (Na), Surlyn 9320 (Zn))" and the ternary copolymerized ionomer such as "HPF 1000 (Mg), HPF 2000 (Mg)" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li, and Mg described in the parentheses after the trade names indicate metal types of neutralizing metal ions for the ionomer resins. The intermediate layer may further contain a specific gravity adjusting agent such as barium sulfate or tungsten or the like; an antioxidant; or a pigment component.

In the case of using the intermediate layer composition containing a rubber composition as a main component (50 mass % or more), the intermediate layer preferably has a thickness of 1.2 mm or more, more preferably 1.8 mm or more, even more preferably 2.4 mm or more, and preferably has a thickness of 6.0 mm or less, more preferably 5.2 mm or less, even more preferably 4.4 mm or less.

In the case of using the intermediate layer composition containing the resin composition as a main component (50 mass % or more), the intermediate layer preferably has a thickness of 0.3 mm or more, more preferably 0.4 mm or more, even more preferably 0.5 mm or more, and preferably has a thickness of 2.5 mm or less, more preferably 2.4 mm or less, even more preferably 2.3 mm or less. If the thickness of the intermediate layer is more than 2.5 mm, the resilience performance of the obtained golf ball may be lowered, while if the thickness of the intermediate layer is less than 0.3 mm, it may be difficult to suppress the excessive spin rate on the driver shot.

A method for molding the intermediate layer is not particularly limited, and includes an embodiment which comprises injection molding the intermediate layer composition directly onto the center, or an embodiment which comprises molding the intermediate layer composition into a half hollow-shell, covering the center with the two hollow-shells and subjecting the center with the two hollow-shells to the compression-molding.

The intermediate layer of the golf ball of the present invention preferably has a slab hardness of 40 or larger, more preferably 45 or larger, and even more preferably 50 or larger, and preferably has a slab hardness of 80 or smaller, more preferably 70 or smaller, and even more preferably 65 or smaller in Shore D hardness. The intermediate layer having the slab hardness of 40 or more in shore D hardness makes the core have the higher degree of "outer-hard and inner-soft" structure, thereby providing a high launch angle and a less amount of spin and hence achieving a great flight distance of the gold ball. On the other hand, the intermediate layer having the slab hardness of 80 or less in shore D hardness provides an excellent shot feeling as well as improves the spin performance of the golf ball, thereby improving controllability of the golf ball. Herein, the slab hardness of the intermediate layer is the measured hardness of the intermediate layer composition in the form of a sheet, and is measured by a later-described measuring method. The slab hardness of the intermediate layer can be adjusted, for example, by appropriately selecting a combination of the above resin components and the rubber materials and the amount of additives.

When preparing a wound golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.
[Evaluation Methods]
(1) Shear Loss Modulus G"
The shear loss modulus G" of the polyurethane composition was measured at the following conditions.
Apparatus: Rheometer ARES available from TA instruments
Test piece: A polyurethane sheet having a thickness of 2 mm was produced by a press molding and a test piece was cut out to have a width 10 mm and a length between the clamps of 10 mm.
Measuring mode: shear mode
Measuring temp.: 0° C.
Oscillation frequency: 10 Hz
Measuring strain: 0.1%
(2) Spin Rate on Approach Shots (Dry Spin, Wet Spin, Spin Retention)
A sand wedge (CG15 forged wedge (52°) manufactured by Cleveland Golf) was installed on a swing robot available from Golf Laboratories, Inc. A golf ball was hit at a head speed of 21 m/sec., and a sequence of photographs of the hit golf ball were taken for measuring the spin rate (rpm). The measurement was performed ten times for each golf ball, and the average value is regarded as the spin rate (rpm). "Dry spin rate (Sd)" means the spin rate where the test was conducted under the condition that a club face and a golf ball were dry. "Wet spin rate (Sw)" means the spin rate where the test was conducted under the condition that a club face and a golf ball were wet with water. The spin retention can be calculated by the following expression.

Wet spin retention $(Rs)=100 \times$ Wet spin rate $(Sw)$/Dry spin rate $(Sd)$ (3) Slab Hardness (Shore D Hardness)
Sheets having a thickness of about 2 mm were prepared from the polyurethane composition by hot press molding and preserved at the temperature of 23° C. for two weeks. Three or more of the sheets were stacked on one another to avoid being affected by the measuring substrate on which the sheets were placed, and the stack was subjected to the measurement using a P1 type auto hardness tester provided with the Shore D type spring hardness tester prescribed by ASTM-D2240, available from KOUBUNSHI KEIKI CO., LTD to obtain the slab hardness of the polyurethane composition.
(4) Core Hardness (JIS-C)
The hardness measured at a surface part of a spherical core using a P1 type auto hardness tester provided with the JIS-C type spring hardness tester available from KOUBUNSHI KEIKI CO., LTD, was determined as the surface hardness of the spherical core, and the JIS-C hardness obtained by cutting a spherical core into halves and measuring at the central point of the cut surface was determined as the center hardness of the spherical core.
(5) Rebound Resilience (%)
A sheet with a thickness of about 2 mm was produced by a heat press molding from the polyurethane composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50 RH %). Preparation of the test piece and the testing method are based on JIS K6255.
(6) Coefficient of Restitution
A 198.4 g of metal cylindrical object was allowed to collide with each golf ball at a speed of 40 m/sec, and the speeds of the cylindrical object and the golf ball before and after the collision were measured. Based on these speeds and the mass of each object, coefficient of restitution for each golf ball was calculated. The measurement was conducted by using twelve of each golf ball, and the average value was regarded as the coefficient of restitution for the golf ball. The coefficient of restitution of golf ball No. 8 was defined as an index of 100.0, and the coefficient of restitution of each golf ball was represented by converting the coefficient of restitution of each golf ball into this index.

Preparation of
1,4-bis(isocyanatomethyl)cyclohexane

Preparation Example 1

As a raw material, 1,4-bis(aminomethyl)cyclohexane (manufactured by Mitsubishi Gas Chemical Company, Inc.) having a trans-isomer/cis-isomer ratio of 93/7 determined by $^{13}$C-NMR was used to perform cold/hot two-stage phosgenation method under normal pressure. Specifically, a stirring rod, a thermometer, a phosgene inlet tube, a dropping funnel, and a condenser tube were attached to a flask, and the flask was charged with 400 parts by mass of ortho dichlorobenzene. While the flask was cooled with cold water, the temperature in the flask was lowered to 10° C. or below, and 280 parts by mass of phosgene was introduced thereinto from the phosgene inlet tube. The dropping funnel was charged with a mixed solution of 100 parts by mass of 1,4-bis(aminomethyl) cyclohexane and 500 parts by mass of ortho dichlorobenzene, and the mixed solution was added into the flask over 30 minutes. During this time, the temperature in the flask was maintained at 30° C. or below. After completion of the addition, a white slurry-like liquid was formed in the flask. Again, the reaction temperature was increased to 150° C. with introducing phosgene, and the reaction was continued at 150° C. for 5 hours. The reaction solution in the flask became a pale-brown transparent liquid. After completion of the reaction, nitrogen gas was introduced at a temperature of 100 to 150° C. at a flow rate of 10 L/hour for degassing. The ortho dichlorobenzene solvent was distilled away under reduced pressure and a fraction having a boiling point of 138 to 140° C./0.7 KPa was further sampled by vacuum distillation. Thus, 123 parts by mass (90% yield) of 1,4-bis(isocyanatomethyl)cyclohexane was obtained in the form of a colorless and transparent liquid. The resulting 1,4-bis(isocyanatomethyl)cyclohexane had a purity, which was determined by gas chromatography, of 99.9%, a hue of 5 in APHA, and a trans-isomer/cis-isomer ratio, which was determined by $^{13}$C-NMR, of 93/7. Hereinafter, 1,4-bis(isocyanatomethyl)cyclohexane having a trans-isomer/cis-isomer ratio of 93/7 is referred to as "BIC93".

Preparation Example 2

1,4-bis(isocyanatomethyl)cyclohexane was prepared in the same manner as Preparation Example 1 except that 1,4-bis(aminomethyl)cyclohexane (manufactured by Tokyo Chemical Industry Co., Ltd.) having a trans-isomer/cis-isomer ratio of 41/59 determined by $^{13}$C-NMR was used as a raw material. The obtained 1,4-bis(isocyanatomethyl)cyclohexane had a purity, determined by gas chromatography, of 99.9%, a hue of 5 in APHA, and a trans-isomer/cis-isomer ratio, determined by $^{13}$C-NMR, of 41/59. Hereinafter, 1,4-bis(isocyanatomethyl)cyclohexane having a trans-isomer/cis-isomer ratio of 41/59 is referred to as "BIC41".

Preparation Example 3

BIC93 and BIC41 were mixed in a ratio of 86.5:13.5 to prepare 1,4-bis(isocyanatomethyl)cyclohexane having a trans-isomer/cis-isomer ratio of 86/14. Hereinafter, 1,4-bis(isocyanatomethyl)cyclohexane having a trans-isomer/cis-isomer ratio of 86/14 is referred to as "BIC86".

Preparation Example 4

BIC93 and BIC41 were mixed in a ratio of 69.2:30.8 to prepare 1,4-bis(isocyanatomethyl)cyclohexane having a trans-isomer/cis-isomer ratio of 77/23. Hereinafter, 1,4-bis(isocyanatomethyl)cyclohexane having a trans-isomer/cis-isomer ratio of 77/23 is referred to as "BIC77".

Preparation Example 5

1,3-bis(isocyanatomethyl)cyclohexane was prepared in the same manner as Preparation Example 1 except that 1,3-bis(aminomethyl)cyclohexane (manufactured by Tokyo Chemical Industry Co., Ltd.) having a trans-isomer/cis-isomer ratio of 74/26 determined by $^{13}$C-NMR was used as a raw material. The obtained 1,3-bis(isocyanatomethyl)cyclohexane had a purity, determined by gas chromatography, of 99.9%, a hue of 5 in APHA, and a trans-isomer/cis-isomer ratio, determined by $^{13}$C-NMR, of 74/26. Hereinafter, 1,3-bis(isocyanatomethyl)cyclohexane having a trans-isomer/cis-isomer ratio of 74/26 is referred to as "BIC74".

[Synthesis of Polyurethane Elastomer]

Polyurethane elastomers having the compositions shown in Table 1 were synthesized as follows. First, polytetramethylene ether glycol (PTMG200) heated at the temperature of 80° C. was added to bis(isocyanatomethyl)cyclohexane (BIC) heated at the temperature of 80° C. Then, dibutyl tin dilaurate (dibutyl tin dilaurate available from Aldrich, Inc.) of 0.005 mass % of the total amount of the raw materials (BIC, PTMG2000, and BD) was added thereto. Then, the mixture was stirred at the temperature of 80° C. for 2 hours under a nitrogen gas flow. Under a nitrogen gas flow, 1,4-butane diol (BD) heated at the temperature of 80° C. was added to the mixture, and the mixture was stirred at the temperature of 80° C. for 1 minute. Then, the reaction liquid was cooled, and degassed under the reduced pressure for 1 minute at the room temperature. After the degassing, the reaction liquid was spread in a container, kept at the temperature of 110° C. for 6 hours under a nitrogen gas atmosphere to carry out an urethane reaction, thereby obtaining polyurethane elastomers.

TABLE 1

| Polyurethane Elastomer Composition | M.W. | PU86-1 | PU86-2 | PU86-3 | PU77 | PU74 |
|---|---|---|---|---|---|---|
| BIC86 | 194 | 1.93 | 2.77 | 3.92 | — | — |
| BIC77 | 194 | — | — | — | 3.66 | — |
| BIC74 | 194 | — | — | — | — | 3.87 |
| PTMG2000 | 2000 | 0.5 | 0.5 | 0.5 | 0.5 | 0.5 |
| BD | 90 | 1.43 | 2.27 | 3.42 | 3.17 | 3.39 |
| Ratio of Trans isomer (mole %) | — | 86 | 86 | 86 | 77 | 74 |
| Hardness (Shore D) | — | 55 | 59 | 63 | 59 | 59 |

Formulation:
molar ratio, M.W.: Molecular weight
BIC86: 1,4-bis(isocyanatomethyl)cyclohexane (trans isomer: 86 mole %)
BIC77: 1,4-bis(isocyanatomethyl)cyclohexane (trans isomer: 77 mole %)
BIC74: 1,3-bis(isocyanatomethyl)cyclohexane (trans isomer: 74 mole %)
PTMG2000: Polytetramethyleneetherglycol (number average molecular weight: 2000) available from BASF Japan Co.
BD: 1,4-butane diol available from Tokyo chemical industry Co., Ltd

[Production of the Golf Ball]
(1) Preparation of the Center

The center rubber compositions having formulation shown in Table 2 were kneaded and pressed in upper and lower molds, each having a hemispherical cavity, at a temperature of 170° C. for 15 minutes to obtain the center in a spherical shape (diameter 38.5 mm).

TABLE 2

| Center rubber composition | A |
|---|---|
| Polybutadiene rubber | 100 |
| Zinc acrylate | 35 |
| Zinc oxide | 5 |
| Diphenyl disulfide | 0.5 |
| Dicumyl peroxide | 1 |

Notes on table 2:
Parts by mass
Polybutadiene rubber: "BR730 (high cis-polybutadiene)" manufactured by JSR Corporation
Zinc acrylate: "ZNDA-90S" manufactured by NIHON JYORYU KOGYO Co,. LTD.
Zinc oxide: "Ginrei R" manufactured by Toho-Zinc Co.
Diphenyl disulfide: manufactured by Sumitomo Seika Chemicals Company Limited
Dicumyl peroxide: "Percumyl D" manufactured by NOF Corporation (2) Preparation of Core Next, the materials for the intermediate layer shown in Table 3 were extruded by a twin-screw kneading extruder to prepare an intermediate layer composition in the form of pellet. Extrusion was performed in the following conditions: screw diameter=45 mm; screw revolutions=200 rpm; and screw L/D=35. The mixtures were heated to a temperature ranging from 150° C. to 230° C. at a die position of the extruder. The obtained intermediate layer composition was injection molded on the center which had been obtained as described above, to prepare a core (diameter 41.7 mm) consisting of the center and the intermediate layer covering the center.

TABLE 3

| | Core No. | 1 |
|---|---|---|
| Center | Center composition | A |
| | Center diameter (mm) | 38.5 |
| Intermediate layer | Intermediate layer composition | a |
| | Himilan 1605 | 50 |
| | Himilan AM7329 | 50 |
| | Slab hardness (Shore D) | 64 |
| | Thickness (mm) | 1.6 |
| Core Properties | Diameter (mm) | 41.7 |
| | Surface hardness (JIS-C) | 98 |
| | Center hardness (JIS-C) | 65 |
| | Hardness difference (JIS-C) | 33 |
| | Compression deformation amount (mm) | 2.55 |

Formulation: parts by mass
Notes on table 3:
Himilan 1605: sodium ion neutralized ethylene-methacrylic acid copolymerized ionomer resin manufactured by MITSUI-DUPONT POLYCHEMICAL CO., LTD.
Himilan AM7329: zinc ion neutralized ethylene-methacrylic acid copolymerized ionomer resin manufactured by MITSUI-DUPONT POLYCHEMICAL CO., LTD.

(3) Molding of Half Shells 100 parts by mass of the polyurethane elastomers shown in Table 4 and 5 were dry blended with 4 parts by mass of titanium oxide, and mixed by a twin-screw kneading extruder to prepare cover compositions in the form of pellet. Extrusion was performed in the following conditions: screw diameter=45 mm; screw revolutions=200 rpm; and screw L/D=35. The mixtures were heated to a temperature ranging from 150° C. to 230° C. at a die position of the extruder. Compression molding of half shells were performed by, charging one pellet of the cover composition obtained as described above into each of depressed parts of lower molds for molding half shells, and applying pressure to mold half shells. Compression molding was performed at a temperature of 170° C. for 5 minutes under a molding pressure of 2.94 MPa.

(4) Molding of the Cover

The core obtained in (2) was covered with the two half shells obtained in (3) in a concentric manner, and the cover was molded by compression molding. Compression molding was performed at a temperature of 145° C. for 2 minutes under a molding pressure of 9.8 MPa.

The surface of the obtained golf ball body was subjected to a sandblast treatment, and marking, and then clear paint was applied thereto and dried in an oven at a temperature of 40° C. to obtain a golf ball having a diameter of 42.7 mm and a mass of 45.3 g. The obtained golf ball was evaluated, and results thereof are also shown in Tables 4 and 5. It is noted that the cover composition was directly injection molded to the core to mold a cover in the golf ball No. 13. Namely, 100 parts by mass of the ionomer resin and 4 parts by mass of titanium oxide were dry blended, followed by mixing with a twin-screw extruder to prepare the cover composition in the pellet form. The cover composition in the pellet form was directly injection molded to the core to mold a cover.

TABLE 4

| | | | Golf ball No. | | | | | | |
|---|---|---|---|---|---|---|---|---|---|
| | | | 1 | 2 | 3 | 4 | 5 | 6 | 7 |
| Cover composition | Resin component | PU86-1 | 100 | — | — | — | — | — | — |
| | | PU86-2 | — | 100 | — | 70 | 50 | 30 | — |
| | | PU86-3 | — | — | 100 | — | — | — | — |
| | | PU77 | — | — | — | — | — | — | — |
| | | PU74 | — | — | — | — | — | — | — |
| | | Elastollan 1154D | — | — | — | — | — | — | 100 |
| | | Elastollan 1159D | — | — | — | 30 | 50 | 70 | — |
| | | Elastollan 1164D | — | — | — | — | — | — | — |
| | | Elastollan XNY55D | — | — | — | — | — | — | — |
| | | Elastollan XNY59D | — | — | — | — | — | — | — |
| | Properties | Rebound resilience (%) | 47 | 42 | 39 | 41 | 39 | 38 | 40 |
| | | Shore D hardness | 55 | 59 | 63 | 59 | 59 | 59 | 55 |
| | | Shear loss modulus G" ($\times 10^7$ Pa) | 3.67 | 6.67 | 11.7 | 8.83 | 11.0 | 15.0 | 10.0 |
| | | Dry spin rate (rpm) | 5700 | 5500 | 5200 | 5300 | 5200 | 5100 | 5350 |
| | | Wet spin rate (rpm) | 2800 | 2600 | 2300 | 2400 | 2250 | 2200 | 2350 |
| | | Spin retention (%) | 49 | 47 | 44 | 45 | 43 | 43 | 44 |
| | Coefficient of Reinstitution | | 102.1 | 101.7 | 101.3 | 101.5 | 101.4 | 100.8 | 100.5 |

Cover composition: Resin component (polyurethane elastomer or ionomer resin) 100 parts, titanium oxide 4 parts

TABLE 5

| | | | Golf ball No. | | | | | | | |
|---|---|---|---|---|---|---|---|---|---|---|
| | | | 8 | 9 | 10 | 11 | 12 | 13 | 14 | 15 |
| Cover composition | Resin component | PU77 | — | — | — | — | — | — | 100 | — |
| | | PU74 | — | — | — | — | — | — | — | 100 |
| | | Elastollan 1154D | — | — | — | — | — | — | — | — |
| | | Elastollan 1159D | 100 | — | — | — | — | — | — | — |
| | | Elastollan 1164D | — | 100 | — | — | — | — | — | — |
| | | Elastollan XNY55D | — | — | 100 | — | — | — | — | — |
| | | Elastollan XNY59D | — | — | — | 100 | — | — | — | — |
| | | Elastollan XNY64D | — | — | — | — | 100 | — | — | — |
| | | Himilan AM7329 | — | — | — | — | — | 70 | — | — |
| | | Nucrel N1050H | — | — | — | — | — | 30 | — | — |
| | Properties | Rebound resilience (%) | 38 | 33 | 30 | 27 | 24 | 40 | 39 | 33 |
| | | Shore D hardness | 59 | 63 | 55 | 59 | 63 | 59 | 59 | 59 |
| | | Shear loss modulus G" ($\times 10^7$ Pa) | 15.1 | 17.1 | 11.5 | 16.0 | 20.0 | 4.07 | 8.81 | 17.0 |
| | | Dry spin rate (rpm) | 5100 | 4950 | 5200 | 5000 | 4800 | 4800 | 5300 | 4950 |
| | | Wet spin rate (rpm) | 2200 | 2100 | 2250 | 2100 | 1950 | 1800 | 2400 | 2100 |

TABLE 5-continued

| | Golf ball No. | | | | | | | |
|---|---|---|---|---|---|---|---|---|
| | 8 | 9 | 10 | 11 | 12 | 13 | 14 | 15 |
| Spin retention (%) | 43 | 42 | 43 | 42 | 41 | 38 | 45 | 42 |
| Coefficient of Reinstitution | 100.0 | 99.3 | 99.3 | 99.1 | 98.9 | 100.5 | 100.6 | 100.4 |

Cover composition: Resin component (polyurethane elastomer or ionomer resin) 100 parts, titanium oxide 4 parts
Materials in tables 4 to 5:
Elastollan 1154D: MDI-polyether type polyurethane elastomer having Shore D hardness of 54 available from BASF Japan Co.
Elastollan 1159D: MDI-polyether type polyurethane elastomer having Shore D hardness of 59 available from BASF Japan Co.
Elastollan 1164D: MDI-polyether type polyurethane elastomer having Shore D hardness of 64 available from BASF Japan Co.
Elastollan XNY55D: $H_{12}$MDI-polyether type polyurethane elastomer having Shore D hardness of 55 available from BASF Japan Co.
Elastollan XNY59D: $H_{12}$MDI-polyether type polyurethane elastomer having Shore D hardness of 59 available from BASF Japan Co.
Elastollan XNY64D: $H_{12}$MDI-polyether type polyurethane elastomer having Shore D hardness of 64 available from BASF Japan Co.

Golf balls No. 1 to No. 15 are distance type golf balls designed to produce a relatively low spin rate by employing a cover material having Shore D hardness of 50 or more. Golf balls No. 1 to 5, and No. 14 are golf balls comprising a cover that is formed from a polyurethane composition containing, as a resin component, a polyurethane elastomer using 1,4-bis(isocyanatomethyl)cyclohexane as a polyisocyanate component, wherein the polyurethane composition has a shear loss modulus G" of more than $5.03 \times 10^6$ Pa and $1.17 \times 10^8$ Pa or less when measured at the conditions of the temperature of 0° C., the oscillation frequency of 10 Hz, and in a shear mode using a dynamic viscoelasticity measuring apparatus. Comparison of golf ball No. 1 with golf balls No. 7 and No. 10 indicates that the golf ball No. 1 of the present invention has high resilience and that both of the dry spin rate and wet spin rate on approach shots are high, although all the covers have Shore D hardness of 55. Comparison of golf ball No. 2 with golf balls No. 8 and No. 11, and comparison of golf ball No. 3 with golf balls No. 9 and No. 12 indicate the similar results. Further, it is clear that the golf ball of the present invention is excellent in the controllability even in the rain, because the golf ball of the present invention has high spin retention.

Golf ball No. 6 is the golf ball having a cover formed from the polyurethane composition containing, as a resin component, a polyurethane elastomer using 1,4-bis(isocyanatomethyl)cyclohexane as a polyisocyanate component, wherein the polyurethane composition has as high a shear loss modulus G" as $15.0 \times 10^7$ Pa. If the golf ball No. 6 is compared with the golf ball of the present invention, it is clear that both of the dry spin rate and wet spin rate on approach shots are low. Golf ball No. 13 is a distance type golf ball that uses an ionomer resin. Comparison of the golf ball of the present invention with the golf ball No. 13 indicates that both of the dry spin rate and the wet spin rate on approach shots of the golf ball of the present invention are higher than those of golf ball No. 13. Golf ball No. 15 is the golf ball having the cover formed from the polyurethane composition containing a polyurethane elastomer using 1,3-bis(isocyanatomethyl)cyclohexane as a polyisocyanate component. The results show that the shear loss modulus G" is as high as $17.0 \times 10^7$ Pa and the rebound resilience is as low as 33%.

Figure 2:
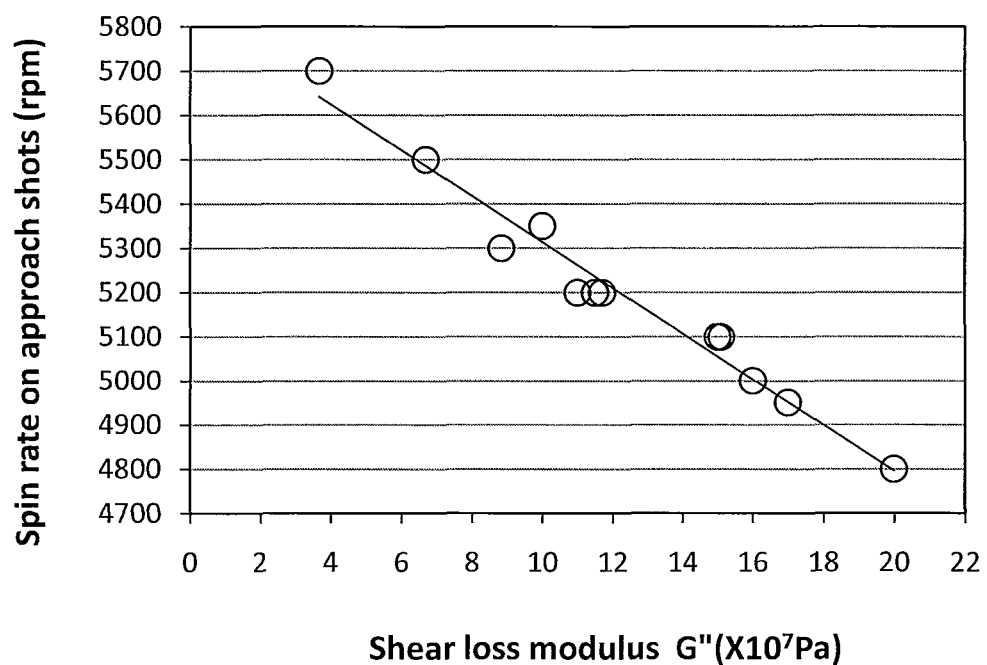
FIG. 2 is a graph showing a correlation between the spin rate on approach shots and the shear loss modulus G".
Figure 3:
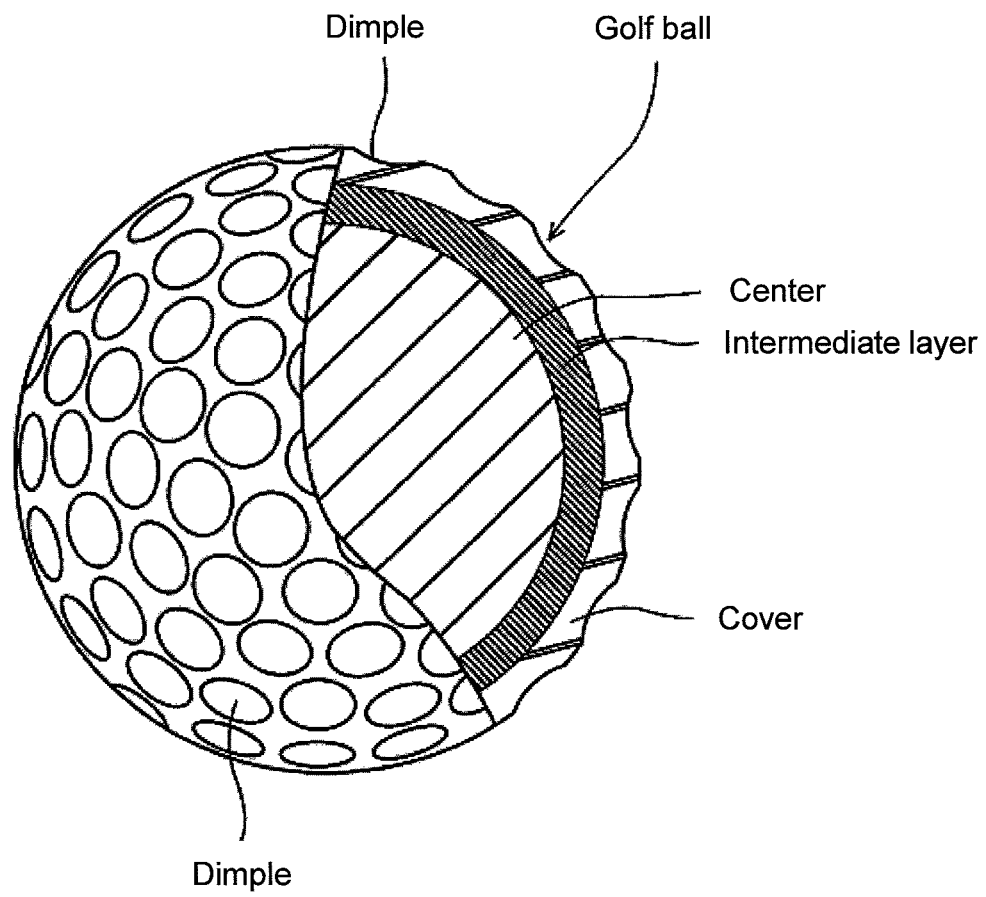
FIG. 3 is an illustration of an embodiment of a golf ball of the present invention.

FIG. 2 is a graph showing a correlation between the spin rate on the approach shots and the shear loss modulus G" with respect to golf balls No. 1 to No. 12, 14, and 15. As apparent from FIG. 2, it has been confirmed that the spin rate on the approach shots increases as the shear loss modulus G" is getting small.

The golf ball of the present invention is suitable for the so-called distance golf ball that focuses on the flying performance. This application is based on Japanese Patent application No. 2010-189619 filed on Aug. 26, 2010, the contents of which are hereby incorporated by reference.

What is claimed is:

1. A golf ball comprising a core and a cover covering the core, wherein the cover is formed from a polyurethane composition containing, as a resin component, a polyurethane elastomer formed from 1,4-bis(isocyanatomethyl)cyclohexane as the only polyisocyanate component,
   wherein the resin component of the polyurethane composition contains the polyurethane elastomer in a content of 50 mass % or more, and
   wherein the polyurethane composition has a rebound resilience of 39% or more and a shear loss modulus G" of more than $5.03 \times 10^6$ Pa and $1.17 \times 10^8$ Pa or less when measured in a shear mode using a dynamic viscoelasticity measuring apparatus at the conditions of the temperature of 0 ° C., and the oscillation frequency of 10 Hz.

2. The golf ball according to claim 1, wherein the 1,4-bis(isocyanatomethyl)cyclohexane contains a trans isomer in a content of 80 mole % or more.

3. The golf ball according to claim 1, wherein the polyurethane composition has a shear loss modulus G" of more than $5.03 \times 10^6$ Pa and $8.83 \times 10^7$ Pa or less.

4. The golf ball according to claim 1, wherein the cover has a thickness ranging from 0.3 mm to 2.0 mm.

5. The golf ball according to claim 4, wherein the polyurethane composition has a slab hardness ranging from 50 to 65 in Shore D hardness.

6. The golf ball according to claim 1, wherein a polyol component constituting the polyurethane elastomer has a number average molecular weight ranging from 200 to 6,000.

7. The golf ball according to claim 1, wherein a polyol component constituting the polyurethane elastomer includes a polyether polyol.

8. The golf ball according to claim 1, wherein a polyol component constituting the polyurethane elastomer includes polytetramethylene ether glycol.

9. A golf ball comprising a core and a cover covering the core, wherein the cover is formed from a polyurethane composition containing, as a resin component, a polyurethane elastomer formed from 1,4-bis(isocyanatomethyl)cyclohexane as the only polyisocyanate component and the cover has a slab hardness ranging from 50 to 65 in Shore D hardness,
   wherein the resin component of the polyurethane composition contains the polyurethane elastomer in a content of 50 mass % or more, and
   wherein the polyurethane composition has a rebound resilience of 39% or more and a shear loss modulus G" of more than $5.03 \times 10^6$ Pa and $1.17 \times 10^8$ Pa or less when measured in a shear mode using a dynamic viscoelasticity measuring apparatus at the conditions of the temperature of 0° C., and the oscillation frequency of 10 Hz.

10. The golf ball according to claim 9, wherein the 1,4-bis(isocyanatomethyl)cyclohexane contains a trans isomer in a content of 80mole % or more.

11. The golf ball according to claim 10, wherein the core has a hardness difference ranging from 10 to 40 in JIS-C hardness between a surface hardness and a center hardness thereof.

12. The golf ball according to claim 11, wherein the core has a center and at least one intermediate layer covering the center.

13. The golf ball according to claim 12, wherein the intermediate layer has a slab hardness ranging from 40 to 80 in Shore D hardness.

14. The golf ball according to claim 13, wherein the polyurethane composition has a shear loss modulus G" of more than 5.03 x$10^6$ Pa and 8.83 x$10^7$ Pa or less.

15. The golf ball according to claim 9, wherein the resin component of the polyurethane composition contains, as a resin component, another polyurethane elastomer which does not use 1,4-bis(isocyanatomethyl)cyclohexane as a polyisocyanate component.

16. The golf ball according to claim 13, wherein the resin component of the polyurethane composition contains only the polyurethane elastomer which uses 1,4-bis(isocyanatomethyl)cyclohexane as a polyisocyanate component.

\* \* \* \* \*